United States Patent
Kondoh

(10) Patent No.: US 6,223,294 B1
(45) Date of Patent: Apr. 24, 2001

(54) PEN-INPUT INFORMATION PROCESSING APPARATUS WITH PEN ACTIVATED POWER AND STATE CONTROL

(75) Inventor: Masanori Kondoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/123,429

(22) Filed: Jul. 28, 1998

(30) Foreign Application Priority Data

Jul. 31, 1997 (JP) .................................................... 9-205577
Jun. 17, 1998 (JP) .................................................. 10-170213

(51) Int. Cl.$^7$ ...................................................... G06F 1/26
(52) U.S. Cl. ........................................... 713/310; 345/179
(58) Field of Search ...................................... 713/300–340, 713/600–601; 345/179–184

(56) References Cited

U.S. PATENT DOCUMENTS 5,483,262 * 1/1996 Izutani ................................. 345/179
5,925,134 * 7/1999 Solomon ............................. 713/324

FOREIGN PATENT DOCUMENTS

| 5-303452 | 11/1993 | (JP) | G06F/1/26 |
| 6-95987 | 4/1994 | (JP) | G06F/13/00 |
| 7-121287 | 5/1995 | (JP) | G06F/3/03 |
| 7-152471 | 6/1995 | (JP) | G06F/3/03 |
| 7-210291 | 8/1995 | (JP) | G06F/3/03 |

* cited by examiner

Primary Examiner—Sumati Lefkowitz
(74) Attorney, Agent, or Firm—Staas & Halsey LLP

(57) ABSTRACT

A pen-input information processing device comprises a pen housing for housing a pen, a processing device, a suspension/resumption-instruction-unit for instructing the processing device to perform state transition, from a suspended state to a normal state and vice versa, a pen-housing-detection-unit which outputs a pen-housing-detection-signal which shows the existence or non-existence of a pen in the pen housing in detecting the housing of the pen in the pen housing, and a state-transition-control-unit which generates a state-transition-control-signal which instructs the processing device to perform the transition of a state unconditionally when the suspension/resumption-instruction-unit instructs the processing device to perform the state transition, or does not instruct the processing device to perform state transition in either case where a state is in the suspended state and also the pen-housing-detection-signal shows the housed state of the pen in the pen housing, or where the state is in the normal state and also the pen-housing-detection-signal shows the taken out state of the pen from the pen housing.

33 Claims, 14 Drawing Sheets

PEN-INPUT INFORMATION PROCESSING APPARATUS WITH PEN ACTIVATED POWER AND STATE CONTROL

BACKGROUND OF THE INVENTION

1. Field of the Invention

The present invention relates to a pen-input information processing device, in particular it relates to the control of a state of the device which is changed with the inserted or taken out state of the pen.

2. Description of the Related Art

In recent years, information processing devices such as personal computers have a trend of being smaller size and lighter weight helped by the development of the technology of high density mounting of parts, and many information processing devices are found in the market which have no keyboards and information is input by pens (hereinafter referred to as a pen-input information processing device). In the case of such an information device, when a user does not use the device, the lowering of power consumption is devised in many ways: the stop of clock pulses and also the cutoff of power supply for all components except that for a memory for saving information, the cutoff of power supply for all components after the saving of all information in a hard disc, or the switching of clock pulses to lower speed clock pulses. As mentioned in the above, an information processing device comprises two kinds of states: a normal state where the device is being used by a user, and another state called a suspended state where the device is not used by a user and clock pulses are stopped and also the power supply for a part of or all components are stopped or clock pulses are switched to lower speed clock pulses.

Heretofore, in the case of a pen-input information processing device in which pen-input is a main input means, when the suspension/resumption process is performed, a suspension/resumption switch is prepared, and when a user is not using the pen-input information device, if the switch is made ON, the device is changed to be in a suspended state, and when the use of the device is to be resumed, the switch is made ON again, then the device is changed to be in a normal state. In another case, application software is prepared, and the device is changed to be in a suspended state by the designation of a user on a menu. When an information processing device is made to be in a suspended state by the suspension/resumption switch, the procedure is as shown below: from an operation mode of (pen input) to a (switching operation for a suspended state) and to a (housing operation of the pen to a pen housing portion), and when it is made to be in a suspended state by application software, the procedure is: from a (suspended state by pen-input) to a (pen housing operation).

In the case of a pen-input information processing device in which pen-input is a main input means being superior to a key-board in operability, it is ideal to perform every processing operation by only a pen. However, as mentioned in the above, in the suspension/resumption process, it is required to operate the suspension/resumption switch or to input with a pen, so that further improvement in operability has been hoped.

SUMMARY OF THE INVENTION

An object of the present invention is to offer a pen-input information processing device in which a suspension/resumption process can be performed with only a pen-input operation.

In accordance with an aspect of the present invention, there is provided a pen-input information processing device which comprises a pen housing to house a pen, a processing device, a suspension/resumption instruction unit to instruct the processing device to perform the transition of a state, from a suspended state where the processing device is not being used to a normal state where the processing device can be used and from the normal state to the suspended state, a pen-housing-detection-unit which detects the housing of a pen in the pen housing and outputs a pen-housing-detection-signal showing the existence of the pen in the pen housing, and a state-transition-control-unit, which generates a state-transition-control-signal which instructs unconditionally the processing device to perform the transition of a state when the suspension/resumption instruction unit instructs the processing device to perform state transition or in either case where the state is in a suspended state and the pen-housing-detection-signal shows that the pen is in a housed state in the pen housing or where the state is in the normal state and the pen-housing-detection-signal shows that a pen is in a taken out state from the pen housing, it does not instruct the processing device to perform the transition of a state. The above-mentioned processing device will be able to offer a pen-input information processing device in which a state can be changed from a normal state to a suspended state or from a suspended state to a normal state based on the state-transition-control-signal.

It is desirable that an instruction unit is further provided which instructs the device to designate the validity/invalidity of the control for the transition of a state by a pen-housing-detection-signal, and the state-transition-control-unit generates a state-transition-control-signal based on the designation of validity/invalidity from the instruction unit.

The above and other objects, features and advantages of the present invention and the manner of realizing them will become more apparent, and the invention itself will best be understood from the study of the following description and the appended claims with reference to the attached drawings showing some preferred embodiments of the invention.

DESCRIPTION OF THE PREFERRED EMBODIMENTS

Figure 1:
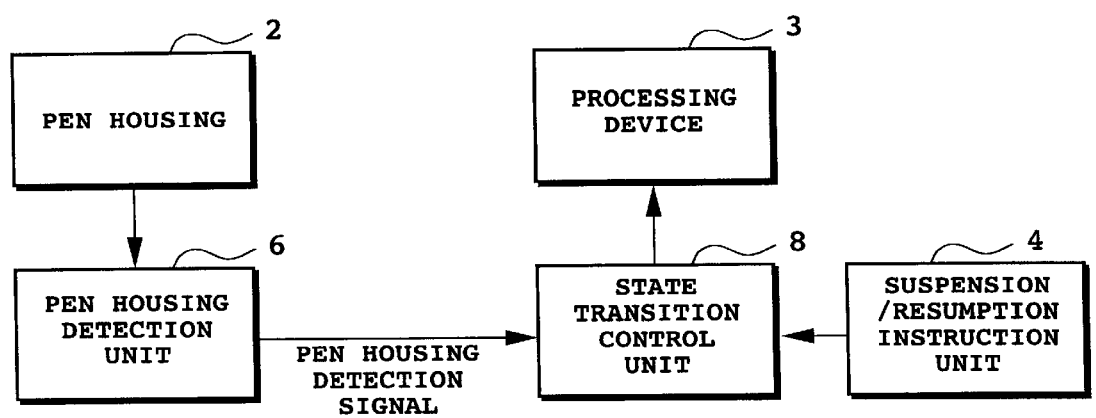
FIG. 1 shows a block diagram showing the principle of the present invention.

At first, the principle of the present invention will be explained referring to the block diagram shown in FIG. 1 before the explanation for the embodiments according to the present invention. As shown in the figure, a pen-input information processing device according to the present invention comprises a pen housing 2, a processing device 3, a suspension/resumption-instruction-unit 4, a pen-housing-detection-unit 6 and a state-transition-control-unit 8. The pen housing 2 is a unit to house a pen. The processing device 3 is a device which performs the transition of a state between a suspended state where the device is not being used by a user and a normal state where the device is being used by a user. The suspension/resumption-instruction-unit 4 is a unit which instructs the processing device 3 to perform the transition of a state from a suspended state to a normal state or from the normal state to the suspended state.

The pen-housing-detection-unit 6 outputs a pen-housing-detection-signal, which shows the existence or non-existence of a pen in the pen housing 2, in detecting the housing of the pen in the pen housing 2. When the suspension/resumption-instruction-unit 4 instructs the processing device 3 to perform transition of a state, the state-transition-control-unit 8 generates a state-transition-control-signal which instructs the processing device 3 to perform unconditionally the transition of a state to the processing device 3; however in either case where a state is in a suspended state and when the pen-housing-detection-signal shows that pen is in a housed state in the pen housing 2 or where a state is in a normal state and when the pen-housing-detection-signal shows that pen is in a taken out state from the pen housing 2, it does not instruct the processing device 3 to perform the transition of a state.

When a user terminates the use of a pen-input information processing device, he instructs the processing device to perform state transition to a suspended state in using the suspension/resumption-instruction-unit 4 such as a switch and the like. When the processing device 3 is instructed by the suspension/resumption-instruction-unit 4 to perform state transition to a suspended state, the state-transition-control-unit 8 outputs a state-transition-control-signal which instructs the processing device 3 unconditionally to perform state transition. Following the instruction, the processing device 3 performs state transition from a normal state to a suspended state. A user houses a pen to the pen housing 2. The pen-housing-detection-unit 4 outputs a pen-housing-detection-signal which shows the housing of a pen into the pen housing 2. The state-transition-control-unit 8 does not instruct the processing device 3 to perform state transition if the processing device is in a suspended state.

In order to resume the use of the pen-input information processing device, the user instructs the processing device 3 to perform state transition, from a suspended state to a normal state, using the suspension/resumption-instruction-unit 4. The state-transition-control-unit 8, when it is instructed to perform state transition by the suspension/resumption-instruction-unit 4, instructs the processing device 3 to perform state transition unconditionally. The processing device 3 performs state transition, from a suspended state to a normal state. The user takes out a pen from the pen housing 2. The pen-housing-detection-unit 4 outputs a pen-housing-detection-signal showing the taken out state of a pen from the pen housing 2. The state-transition-control-unit 8 does not instruct the processing device 3 to perform state transition if the state of the processing device 3 is in a normal state. Therefore, even in a case where the state transition by the suspension/resumption-instruction-unit 4 and a state transition by the pen-housing-detection-signal are used jointly, the processing device 3 does not perform an erroneous operation.

The First Embodiment

Figure 2:
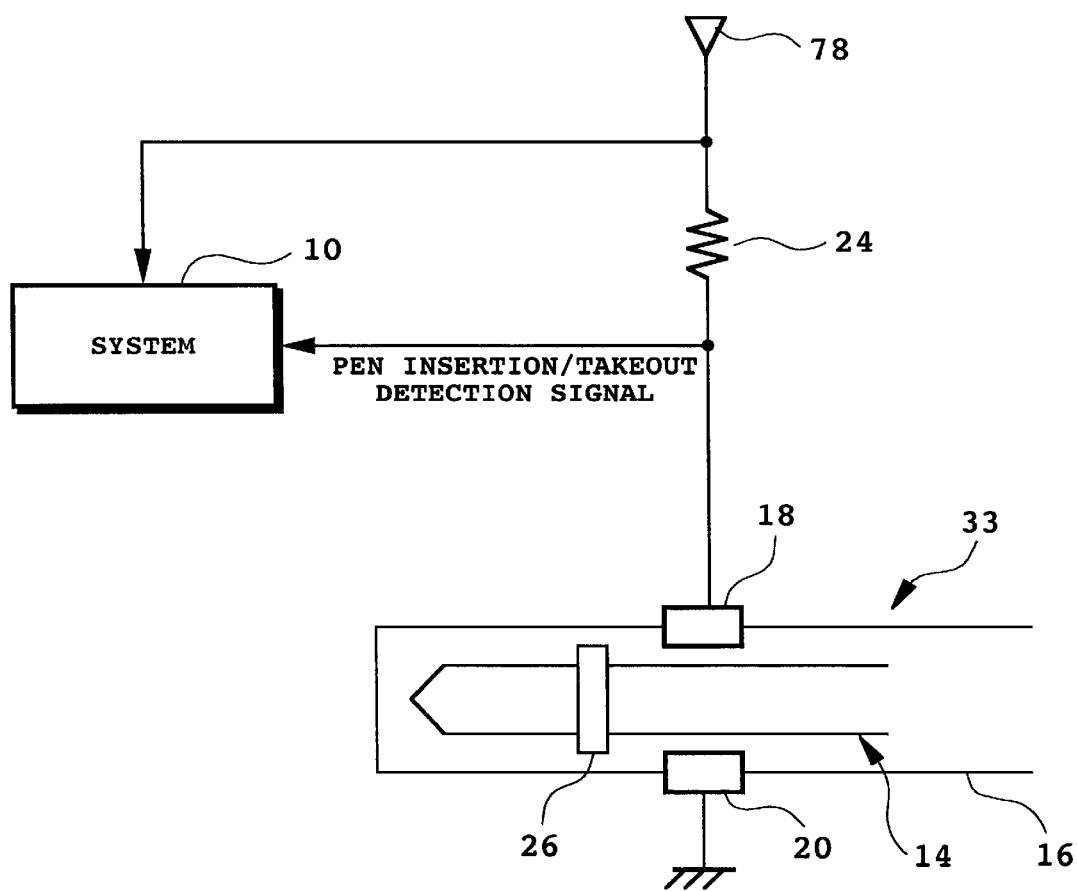
FIG. 2 shows a block diagram of a pen-input information processing device shown in the first embodiment according to the present invention.
Figure 3:
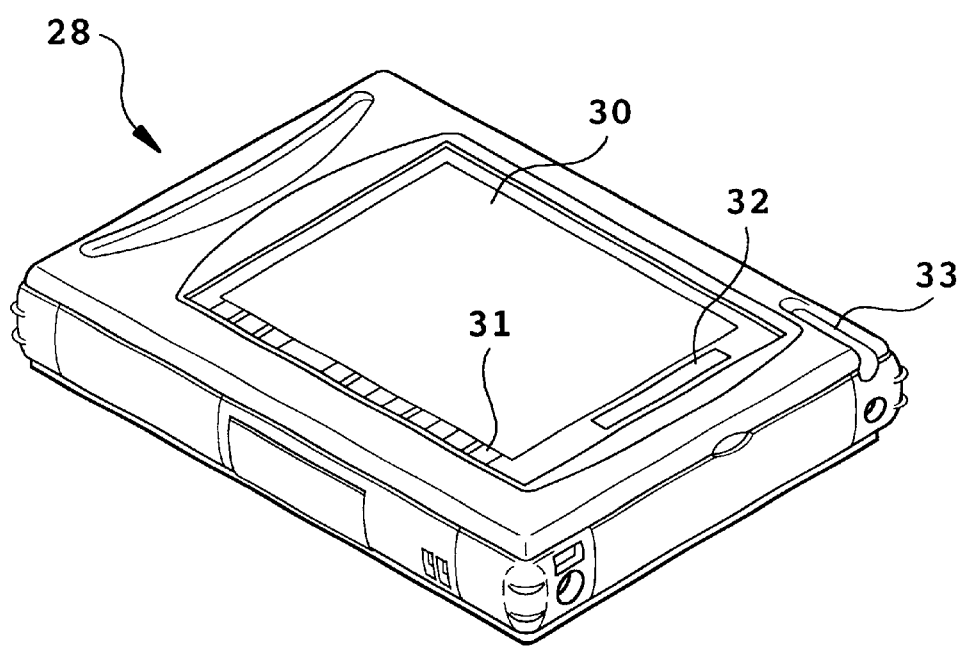
FIG. 3 shows a perspective view of a pen-input information processing device shown in FIG. 2.
Figure 4:
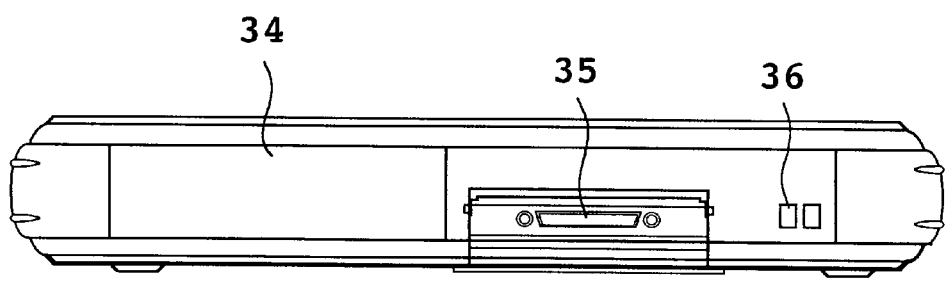
FIG. 4 shows a front view of the pen-input information processing device shown in FIG. 3.
Figure 5:
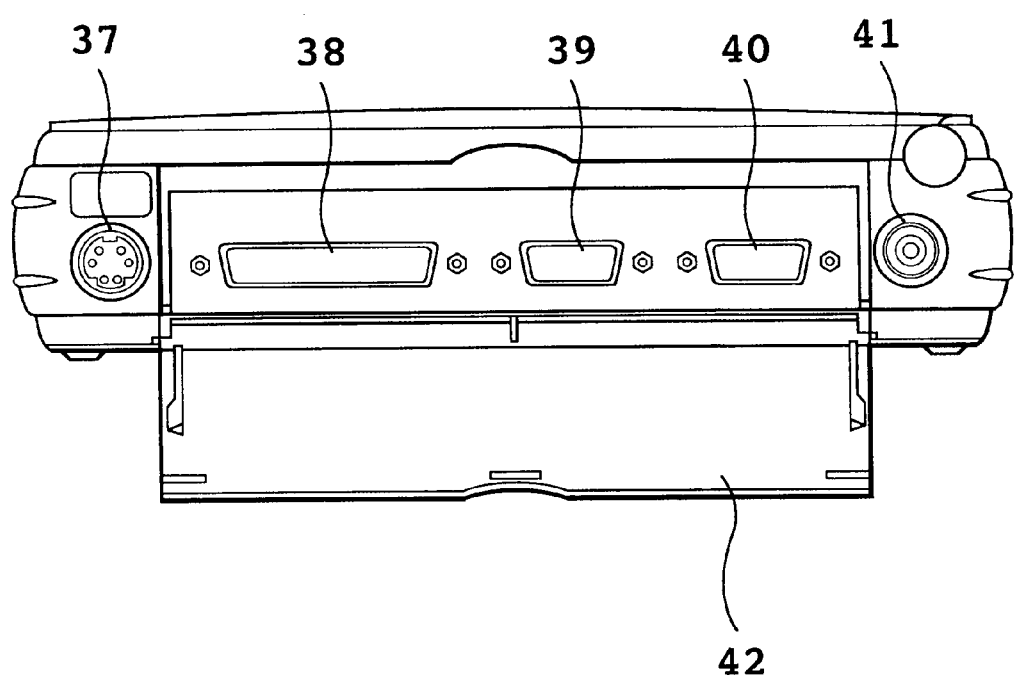
FIG. 5 shows a side view on the right side of the device shown in FIG. 3.
Figure 6:
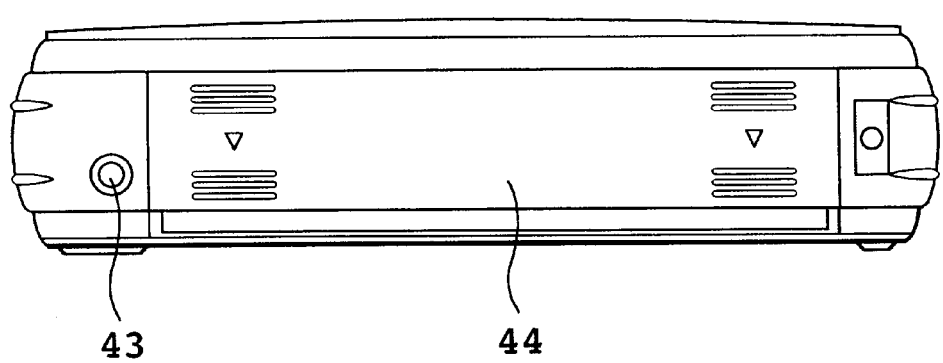
FIG. 6 shows a side view on the left side of the device shown in FIG. 3.
Figure 7:
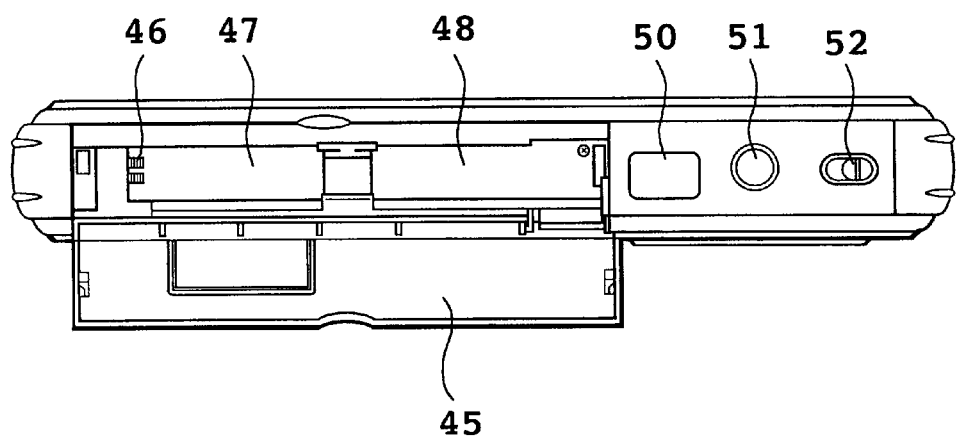
FIG. 7 shows a back view of the device shown in FIG. 3.

FIG. 2 shows a constitutional drawing of a pen-input information processing device shown in the first embodiment according to the present invention. As shown in the figure, the pen-input information processing device comprises a system 10, a pen-housing portion 33 and a pen 14. FIG. 3 shows a perspective view of the pen-input information processing device shown in FIG. 2, FIG. 4 shows a front view of the device shown in FIG. 3, FIG. 5 shows a side view on the right side of the device shown in FIG. 3, FIG. 6 shows a side view on the left side of the device shown in FIG. 3, and FIG. 7 shows a back view of the device shown in FIG. 3. The system 10 is housed in a cubicle 28 shown in FIG. 3. In FIG. 3, 30 denotes a liquid crystal display (LCD), 31 denotes a control area for adjusting concentration, 32 denotes LCD for displaying a state such as suspension/resumption state, and 33 denotes a pen housing portion. In FIG. 4, 34 denotes a cover for a built-in battery pack, 35 denotes an expansion connector, and 36 denotes a DC outlet.

In FIG. 5, 37 denotes a keyboard connector for connecting a keyboard, 38 denotes a parallel interface connector for connecting a printer and the like, 39 denotes a serial interface connector for connecting the equipment having an interface of the RS-232C standard, 40 denotes a CRT interface connector for connecting a CRT display, 41 denotes a DC-IN connector for connecting an AC adapter, and 42 denotes an interface connector cover which can be opened when the connectors are used.

In FIG. 6, 43 denotes a reset switch which is operated by depression in inserting the tip of a pen to push it, and it is to be used when software is reactivated in erasing data in a memory, and 44 denotes the battery pack. In FIG. 7, 45 denotes a card slot cover which is opened when each card is set or taken out, 46 denotes a PC card take-out button to be pushed when a PC card is taken out. 47 denotes a PC card slot for setting a PC card, 48 denotes a hard disc card slot for setting a hard disc card, 50 denotes an infrared communication port for performing infrared communication, 51 denotes a suspension/resumption switch for suspending or resuming the use of a personal computer main body, and 52 denotes a power supply switch for making ON/OFF of power for the personal computer main body.

Figure 8:
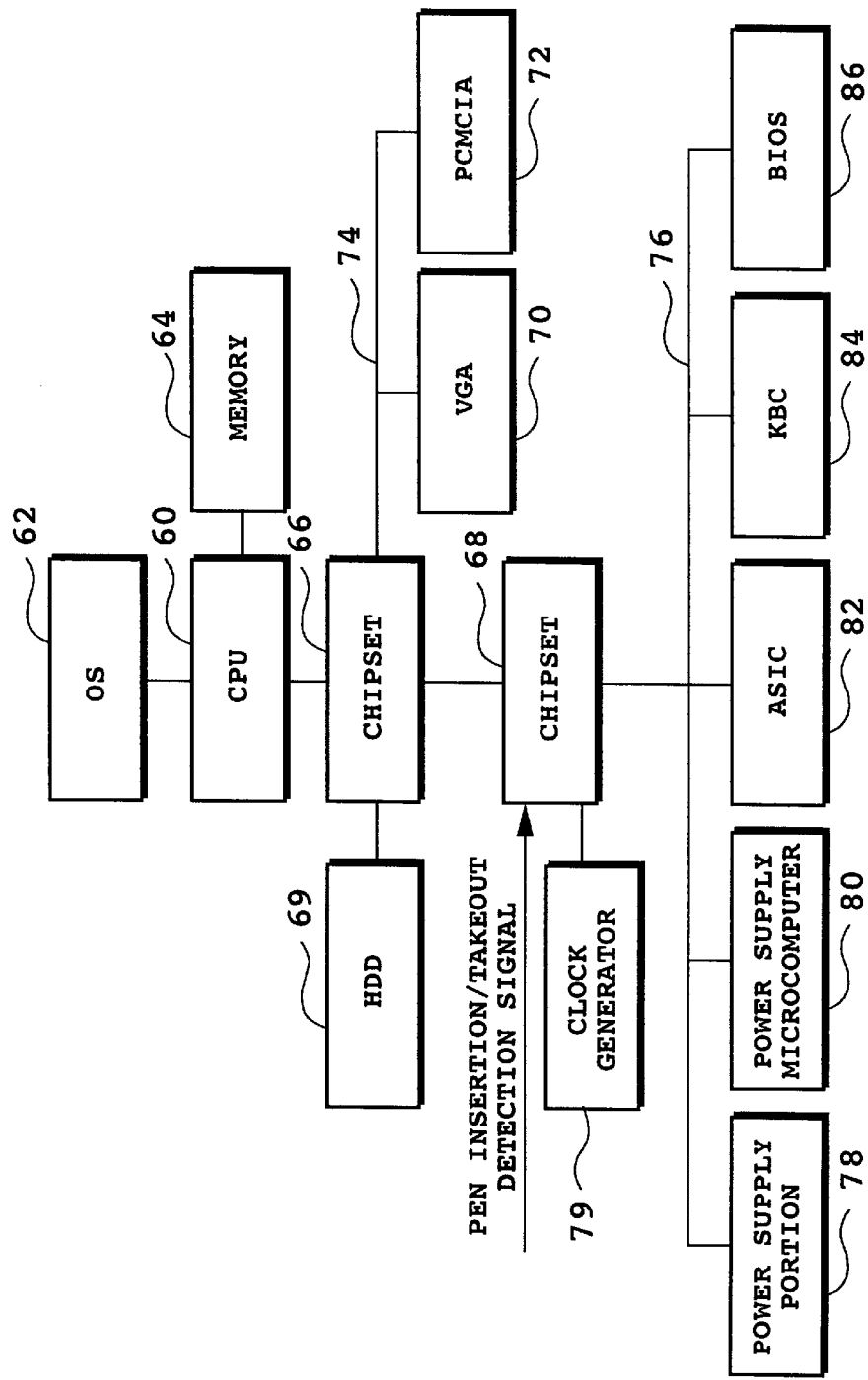
FIG. 8 shows a system block diagram of the device shown in FIG. 2.

FIG. 8 shows a system block diagram of a device shown in FIG. 2. The system 10 shown in FIG. 2, as shown in FIG. 8, comprises a CPU 60, an OS 62, a memory 64, chip sets 66 and 68, a hard disc (HDD) 69, a VGA 70, a PCMCIA 72, a clock pulse generator 79, a power supply portion 78, a power supply microcomputer 80, an ASIC 82, a keyboard controller (KBC) 84 and a BIOS 86. Among the chip set 66, the VGA 70 and PCMCIA 72 are connected with a PCI bus 74. Among the chip set 68, the power supply portion 78, the power supply microcomputer 80, the ASIC 82, the KBC 84 and the BIOS 86 are connected with the ISA 76. The CPU 60 is a processor (for example, Pentium (manufactured by Intel)) for processing information. The OS 62 is a basic software which controls application software and the like. The memory 64 is a main memory for storing programs and the like which are executed by the CPU 60.

The chip set 66 performs the control of the PCI bus, the saving of information to the memory 64 or to the HDD 69 according to the mode of a suspended state set in the BIOS 86, and for example 430TX (manufactured by Intel) is used for it. The chip set 68 performs the control of the ISA bus 76, and when a device is controlled to perform transition of a state to a suspended state by a pen-insertion/takeout-detection-signal, it instructs the chip set 66 to save of information to the HDD 69 or to the memory 64 according to the mode of the suspension, and also instructs the power supply microcomputer 80 to suspend the supply of power from the power supply portion 78 to respective parts. A 430TX (manufactured by Intel), for example, is used for it. Several kinds of modes can be considered in a suspended state, such as the stop of clock pulses/slow down of clock pulses, OFF of power supply to all equipment except to the memory 64, and OFF of power supply to all equipment including the memory 64. The mode in a suspended state can be set arbitrarily, for example, in the BIOS 86 as a parameter, and when a system is activated, the BIOS 86 loads an initialized parameter in the memory 64 and the chip set 68 controls a device to be in a suspended state of a mode according to the setting.

For example, there is a mode in which the output of the clock pulse generator 79 is stopped and simultaneously information is saved in the memory 64 and then power supply is cut off except that for the memory 64, and there is another mode in which information is saved in the HDD 69 and then power supply for all portions is cut off.

The VGA 70 is a controller for controlling the display 30. The PCMCIA 72 is an interface circuit which controls the PCMCIA interface. The clock pulse generator 79 is a circuit for generating a clock pulse signal. The power supply portion 78 is a DC/DC converter for generating a power supply voltage. The power supply microcomputer 80 is a microcomputer for controlling the supply/stop of supply of power to respective portions according to the instruction of the chip set 68. ASIC 82 is a characteristic application LSI. The KBC 84 is a controller for controlling a keyboard. When the system 10 is activated, BIOS 86 performs an initial setting and loads parameters including the mode in a suspended state on the memory 64.

The pen housing portion 33 shown in FIG. 2 and FIG. 3 houses a pen 14, and comprises a pen housing case 16, and conductors, 18 and 20. The pen housing case 16 is the case for housing the pen 14, and is made of plastic and the like. The conductors, 18 and 20, are metallic parts disposed on the upper and lower sides of the pen housing case 16, springs are provided inside of them, though they are not shown in a drawing, and by the force of the springs the pen 14 can be inserted into or pulled out of the pen housing portion 33, and also in the above motions, the conductors, 18 and 20, are arranged to make contact with the pen 14. The conductor 18 which is disposed on the upper side of the pen housing case 16 is connected to the power supply portion 78 through a resistor 24. The conductor 20 which is disposed on the lower side of the pen housing case 16 is grounded. The pen 14 is an input means for inputting information to a pen-input information processing device, and around a part of the pen 14, being close to the tip portion, a conductor 26 is provided and the conductor 26 is arranged to make contact with the conductors, 18 and 20, when the pen 14 is inserted into or pulled out of the pen housing portion 33. The pen-insertion/ takeout-detection-signal is input to the chip set 68 in the system 10 through a node on a line connecting the resistor 24 and the conductor 18.

In the following, the operation of a pen-input information processing device in the first embodiment shown in FIG. 2 will be explained.

(a) The Operation When the Power Supply is Made to Start

When a user starts to use a pen-input information processing device, after taking out the pen 14 from the pen housing portion 33, makes the power supply switch 52 ON. When the power supply switch 52 is made ON, parameters including the mode of a suspended state are loaded on the memory 64 and initialized by the BIOS 86 in the system 10, and the system 10 is activated and the state of the device is made to performs transition to a normal state. The conductor 18 and the conductor 20 are electrically insulated, so that the resistor 24 is pulled up by the power supply portion 78, and the pen-insertion/takeout-detection-signal becomes high level (hereinafter referred to as "H").

(b) The Operation When the Pen 14 is Housed

A user inputs information to a pen-input information processing device using the pen 14, and the system 10 processes information. When the user terminates the use of the pen-input information processing device, he inserts the pen 14 into the pen housing portion 33. At this time, the conductor 26 which is disposed around the pen 14 comes into contact with the conductors, 18 and 20, of the pen housing portion 33. By the contact, the conductors, 18 and 20, in the pen housing portion 33 are electrically connected through the conductor 26, and a current flows from the power supply portion 78 to the ground. Thereby, the potential of the node connecting the resistor 24 and the conductor 18 is lowered, and the pen-insertion/takeout-detection-signal is changed to a low level (hereinafter referred to as "L") from "H". The pen 14 is inserted in pressing the springs in the conductors, 18 and 20, and the pen 14 is housed in the pen housing portion 33 in a state where the conductor 26 on the pen 14 is in an noncontacted state to the conductors, 18 and 20. Thereby the conductor 18 is insulated from the conductor 20, and the potential of the node between the resistor 24 and the conductor 18 becomes "H" and the pen-insertion/takeout-detection-signal becomes "H".

As mentioned in the above, the pen-insertion/takeout-detection-signal is changed as "H" "L" "H" with the housing of the pen 14 into the pen housing portion 33, and pulses are output to the system 10. The chip set 68 in the system 10 instructs the chip set 66 to save the information, for example, at the leading edge of the pulse in receiving the pulse of the pen-insertion/takeout-detection-signal. The chip set 66 saves the information in the memory 64 or HDD 69 according to the mode of the suspended state which is loaded on the memory 64 by the BIOS 86, and the chip set 68 is informed of the result. The chip set 68 instructs the clock pulse generator 79 to stop the supply of clock pulses, and also instructs the power supply microcomputer 80 to stop the power supply according to the mode of the suspended state. The clock pulse generator 79 stops the supply of clock pulses following the instruction of the chip set 68. The power supply microcomputer 80 stops the supply of power according to the mode of the suspended state in controlling the power supply portion 78. Thereby, when the pen 14 is housed in the pen housing portion 33, the system 10 becomes a suspended state automatically.

(c) The Operation When the Pen 14 is Taken Out

When the pen 14 is taken out from the pen housing portion 33, as mentioned in the above, a pen-insertion/ takeout-detection-pulse is output to the system 10. The chip set 68 in the system 10 instructs the chip set 66 to restore the information which has been saved therein to the memory 64. The chip set 66 restore the information saved in the memory 64 or in the HDD 69, and the chip set 68 is informed of the result. The chip set 68 instructs the clock pulse generator 79 to resume the supply of clock pulses and also instructs the power supply microcomputer 80 to resume the supply of power. The clock pulse generator 79 resumes the supply of clock pulses following the instruction of the chip set 68. The power supply microcomputer 80 resumes the supply of power in controlling the power supply portion 78. Thereby, the state of the system 10 is changed, from a suspended state to a normal state, and again the user is made to be able to use the pen-input information processing device.

In such a way as mentioned in the above, every time when the pen 14 is inserted into or taken out from the pen housing portion 33, a pulse of the pen-insertion/takeout-detection-signal is output to the system 10 and the state of the system 10 is changed from a suspended state to a normal state and vice versa. As explained in the above, according to the first embodiment, the insertion into or taking out from the pen housing portion 33 of the pen 14 is detected and a pulse of the pen-insertion/takeout-detection-signal is output to the system 10, and the state of the system 10 is automatically changed, so that there is no need that a user instruct the transition of a state, which grades up the operability of the device.

The Second Embodiment

Figure 9:
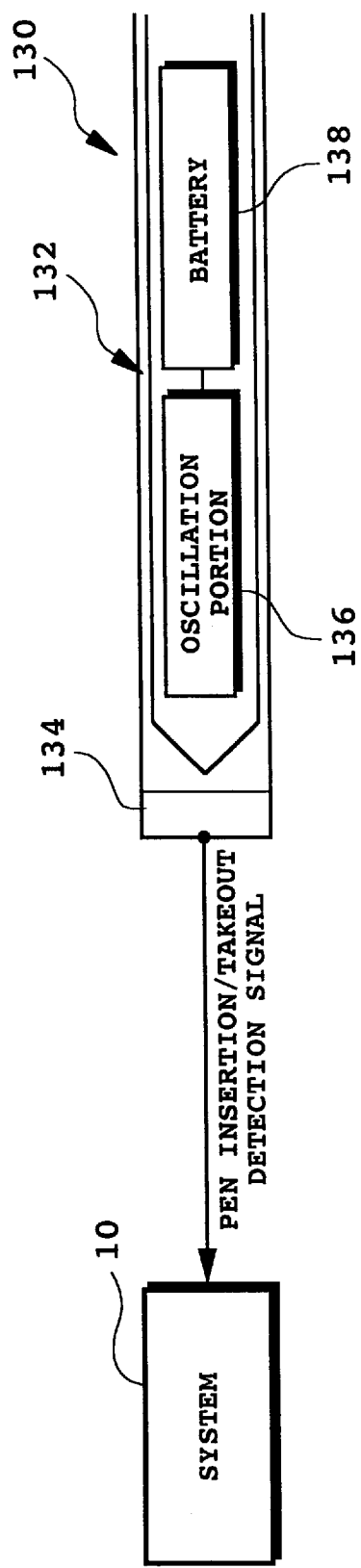
FIG. 9 shows a block diagram of a pen-input information processing device shown in the second embodiment according to the present invention.

FIG. 9 is a constitutional drawing of a pen-input information processing device shown in the second embodiment according to the present invention. As shown in the figure, a pen-input information processing device comprises a system 100, a pen housing portion 130 and a pen 132. The system 100 has the same constitution as the system 10 shown in FIG. 2; however, the structures of the display 30 and the pen housing portion 33 shown in FIG. 3 are different from those shown in the present embodiment. Over the surface of the display, sensor elements which detect the position of the pen 132 in detecting the electromagnetic wave transmitted from the pen 132 are provided. There are provided in the pen housing portion 130 a pen-insertion/takeout-detection-portion 134 being composed of a sensor panel which detects the electromagnetic wave output from the tip of the pen 132 being positioned at a place facing the tip of the pen 132 when the pen 132 is housed, and a microcomputer which generates a pen-insertion/takeout-signal in detecting the insertion/takeout of the pen 132 to or from the pen housing portion 130 by the comparison of a receiving level detected by the sensor panel with a threshold value. The pen 132 is an input means of an electromagnetic induction type to input information to a pen-input information processing device, and comprises an oscillation portion 136 which outputs an electromagnetic wave and a battery 138.

In the following, the operation of a pen-input information processing device in the second embodiment shown in FIG. 9 will be explained.

(a) The Operation When the Power Supply is Activated

When a user starts to use a pen-input information processing device, after taking out the pen 132 from the pen housing portion 130 he will make the power supply switch 52 ON shown in FIG. 7. When the power supply switch is made ON, the system 100 is operated in the same way as the system 10 is operated as shown in FIG. 2 and it is activated to be a normal state. When the user brings the pen 132 close to the display 30 of a pen-input information processing device, the sensor elements disposed over the surface of the display 30 detect the electromagnetic wave generated by the pen 132 and by detecting the position of the pen 132 the information is input with the pen 132 to be processed.

(b) The Operation When the Pen 132 is Housed

When a user terminates to use a device, he will insert the pen 132 into the pen housing portion 130. When the pen 132 is inserted into the pen housing portion 130, the sensor panel of the pen-insertion/takeout-detection-portion 134 detects the electromagnetic wave generated by the pen 132, and the microcomputer is informed of it. The microcomputer compares the received level of the electromagnetic wave with a threshold value, and when the received level is larger than the threshold value, it generates a pulse of the pen-insertion/takeout-detection-signal and outputs it to the system 100. The system 100, in receiving the pulse of the pen-insertion/takeout-detection-signal at the front edge of the pulse, for example, is operated in the same way as the system 10 shown in FIG. 2, and the state of the system is changed from a normal state to a suspended state. Thereby, when the pen 132 is housed, the state of the system 100 is changed automatically to a suspended state.

(c) The Operation When the Pen 132 is Taken Out

When the pen 132 is taken out from the pen housing portion 130, the sensor panel becomes unable to receive the electromagnetic wave and the receiving level is decreased. The microcomputer compares the received level by the sensor panel with a threshold value and when the received level is smaller than the threshold value it detects that the pen 132 is taken out from the pen housing portion 130, and outputs a pulse of the pen-insertion/takeout-detection-signal to the system 100. The system 100, in receiving the pulse, is operated in the same way as the system 10 shown in FIG. 2, and the state is changed from a suspended state to a normal state. Thereby, the user is made possible to use the pen-input information processing device.

As mentioned in the above, every time when the pen 132 is inserted into or taken out from the pen housing portion 130, a pulse of the pen-insertion/takeout-detection-signal is output to the system 100, and the state of the system 100 is changed from a suspended state to a normal state and vice versa. The effects equivalent to the effects to be obtained in the first embodiment can be obtained in the second embodiment.

The Third Embodiment

Figure 10:
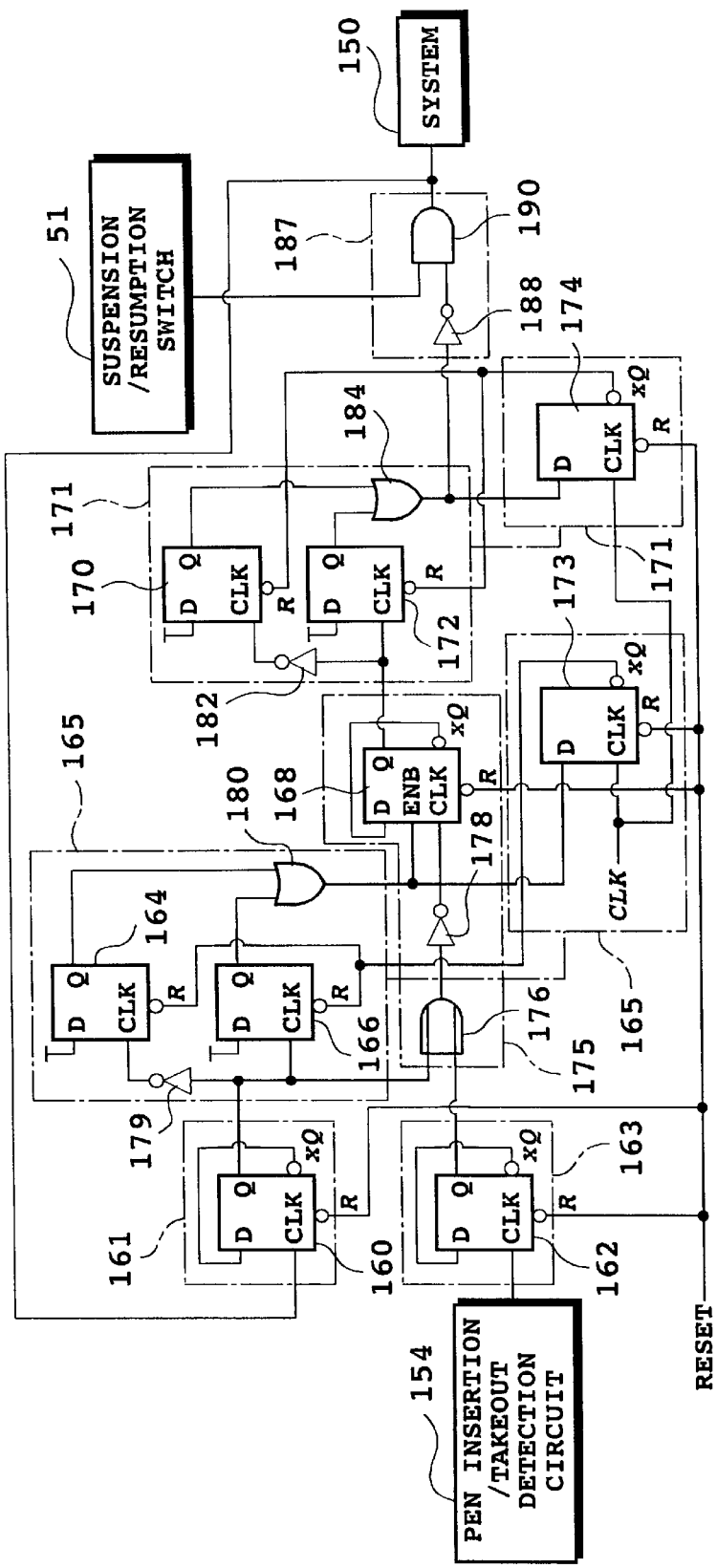
FIG. 10 shows a block diagram of a pen-input information processing device shown in the third embodiment according to the present invention.

FIG. 10 shows a block diagram of a pen-input information processing device in the third embodiment according to the present invention. As shown in the figure, the pen-input information processing device comprises a system 150, a suspension/resumption-switch 51, a pen-insertion/takeout-detection-circuit 154, a state-memorizing-circuit 161, a pen-state-memorizing-circuit 163, a state-transition-suppression-circuit 165, a state-transition-pulse-generation-circuit 171, a state-transition-control-circuit 175, a state-transition-pulse-output-circuit 187, pens, 14 and 132, having the same structure as those shown in FIG. 2 and FIG. 9, and pen housing portions, 33 and 130. The system 150 is an information processing device being constituted in the same way as that shown in FIG. 8, and the state of the device is changed from a normal state to a suspended state and vice versa following the state-transition-control-signal input from the state-transition-pulse-output-circuit 187.

The suspension/resumption switch 51 generates a pulse signal which instructs the system to perform state transition with the ON-OFF of the switch by a user, and in the present example, when the switch is made OFF, an "H" pulse is output and when it is made ON a pulse which changes, "H" "L" "H", is output. The pen-insertion/takeout-detectioncircuit 154 is constituted in the same way as those shown in FIG. 2 and FIG. 9, and it detects the insertion/takeout of a pen to and from the pen housing portion and outputs a pulse of the pen-insertion/takeout-detection-signal. The state memorizing circuit 161 is a circuit which memorize the state of the system 150, that is, whether it is in the normal state or in the suspended state, and comprises a flip-flop circuit 160 (hereinafter referred to as FF). In the present example, when the output of the terminal Q of the FF 160 is "L", the system is in a normal state, and when it is "H" the system is in a suspended state. The pen-state-memorizing-circuit 163 memorizes the state of a pen, that is, whether the pen is in a taken out state from the pen housing portion or it is in a housed state in the pen housing portion following the pulse of the pen-insertion/takeout-detection-signal output from the pen-insertion/takeout-detection-circuit 154, and comprises the FF 162. In the present example, "L" shows the state where the pen is taken out, and "H" shows the state where the pen is housed.

The state-transition-suppression-circuit 165 generates a pulse which disables FF 168 and prevents further transition of the state of the system 150 caused by the variation of the output of the FF 160, and comprises an FF 164, an FF 166, an FF 173, and an OR gate 180. Terminals D in the FF 164 and FF 166 are connected to the power supply ("H"). The state-transition-control-circuit 175 instructs the system 150 to change the state unconditionally when a pulse signal generated by ON of the suspension/resumption switch 51 is input, and in a case where the output of the terminal Q of the FF 160 shows a suspended state (for example, "L") and the output of the FF 162 shows the housed state of the pen (for example, a case where a state is changed from "L" to "H"), or in a case where the system 150 is in a normal state and also the output of the FF 162 shows a taken out state of the pen (for example, the state is changed from "H" to "L"), the state-transition-control-circuit 175 does not instruct the system 150 to change the state, and in the case other than the above, it instructs the system 150 to change the state when the output of the FF 162 is changed.

The state-transition-control-circuit 175 comprises an EX-OR gate 176, an inverter 178 and an FF 168. In the present example, it is arranged that a normal state is denoted by "L", a suspended state is denoted by "H", and a state where a pen is housed is denoted by "H", a state where the pen is taken out is denoted by "L", so that when the output of a terminal Q of the FF 160 is "L", in a case where the output of the terminal Q of the FF 162 is changed to "L", the output of the inverter 178 becomes "L" and when the output of the FF 160 is "H", in a case where the output of the terminal Q of the FF 162 is changed to "H", the output of the inverter 178 becomes "L", and in other cases than the above, the output of the inverter 178 becomes "H". The FF 168 is a flip-flop circuit, which is disabled when the terminal ENB is "H" and is enabled when the terminal ENB is "L", and it outputs a signal from the terminal Q which instructs the system to change the state.

The state-transition-pulse-generation-circuit 171 generates a pulse which gives an instruction to change the state when the output of the terminal Q of the FF 168 is changed, and it comprises an inverter 182, FFs 170, 172, 174, and the OR gate 184. The terminals D of the FFs 170 and 172 are connected to the power supply. The state-transition-pulse-output-circuit 187 outputs a state-transition-control-signal, and it comprises an inverter 188 and an AND gate 190. The inverter 188 reverses the output of the OR gate 184 and outputs "H" excepting the case where the output of the OR gate 184 is a pulse. An AND gate 190 outputs the output pulse of the insertion/resumption switch 51 and the output pulse of the OR gate 184. In each of the FFs 160, 162, 164, 166, 170, 172, 173 and 174, when the terminal R is "H" and the terminal Q is "L", an input signal from the terminal D is latched at the leading edge of a signal from the terminal CLK, and the signal is output from the terminal Q. A terminal xQ outputs a reversed signal of what is output from the terminal Q. The clock signal CLK is output from the clock pulse generator 79 shown in FIG. 8, and it is input to the terminals CLK of FFs 173 and 174.

In the following, the operation of a pen-input information processing device in the third embodiment shown in FIG. 10 will be explained.

(a) The Operation When Only the Suspension/Resumption Switch 51 is Used

Figure 11:
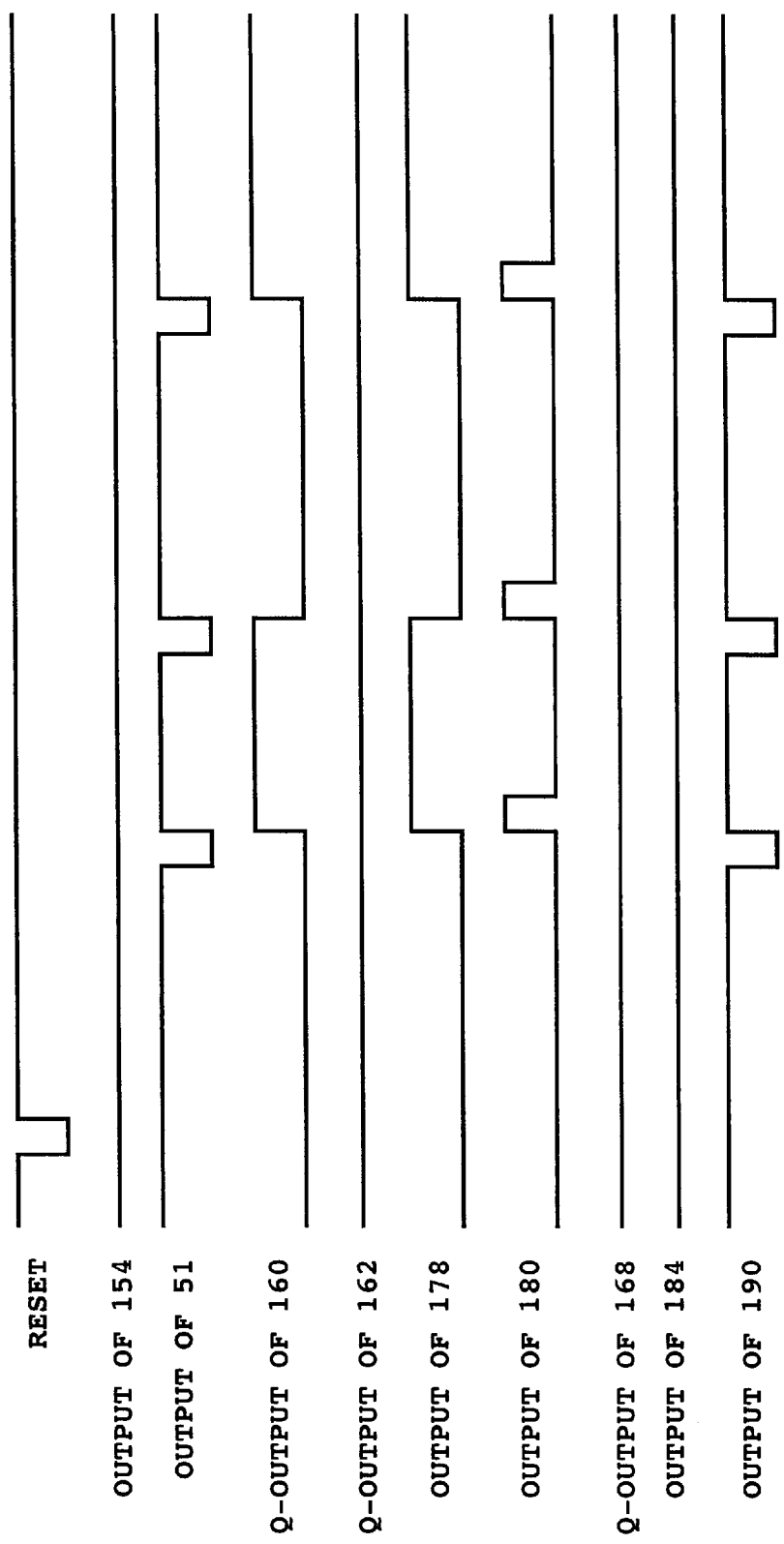
FIG. 11 shows a time chart in the device shown in FIG. 10.

FIG. 11 shows a time chart of the device shown in FIG. 10, when only the suspension/resumption switch 51 is used. When a user starts to use a pen-input information processing device, he will take out a pen constituted in the same way as the pen 14 or 132 from a housing portion constituted in the same way as the housing portion 33 or 130 shown in FIG. 2 or FIG. 9, and then he will make the power supply switch 52 shown in FIG. 7 ON. When the power supply switch 52 is made ON, the system 150 is operated in the same way as the system 10 shown in FIG. 2 is operated to be activated, and the state is changed to be in a normal state. The pulses of a reset signal RESET are output with power-ON-reset. The FFs 160, 162, 173 and 174 are reset by the reset signal RESET, and "L" are output from the terminals Q. The FFs 170 and 172 are reset by the FF 174, and "L" are output from the terminals Q. Thereby, the outputs of the inverter 178, and OR gates 180 and 184 are turned to "L", and the output of the inverter 188 is turned to "H".

It is assumed that after terminating the process in a pen-input information processing device, the user will depress the suspension/resumption switch 51 to make the system be in a suspended state. The suspension/resumption switch 51 outputs a pulse. The pulse is input to the AND gate 190. Since the other input of the AND gate 190 is "H", the pulse output from the AND gate 190 is input to the system 150 and the FF 160. In receiving the pulse, the system 150 is operated, in the same way as the system 10 shown in FIG. 2 is operated, to perform state transition. The pulse is also input to the terminal CLK of the FF 160, and the FF 160 outputs "H", input to the terminal D at a leading edge of the pulse, from the terminal Q. Thereby, the output of the terminal Q of the FF 160 is changed from "L" to "H", and the output of the inverter 178 is also changed from "L" to "H".

Since the terminal Q of the FF 160 is changed from "L" to "H", the FF 166 outputs a power supply potential "H" input to terminal D. The OR gate 180 outputs "H" to the terminal D of the FF 173. The FF 173 outputs "L" from the terminal xQ at the leading edge of the clock pulse signal CLK. The FFs 164 and 166 are reset by the output "L" from the terminal xQ, and output "L" from the terminals Q. As a the result, a pulse is output from the terminal Q of the FF 166.

The pulse is input to the terminal ENB of the FF 168. Since the terminal ENB is changed to "H" the FF 168 is disabled, so that even when the terminal CLK is changed from "L" to "H", the output of the terminal Q is not changed. Therefore, even if the output of the terminal Q of the FF 168 is changed from "L" to "H", the outputs of the FFs 168, 170, 172, the OR gate 184 and the inverter 188 are not changed, so that further pulse is not output by the ON of the suspension/resumption switch 51, which prevents the erroneous operation of the system 150.

The user depresses the suspension/resumption switch 51 in order to change the state to the normal state. Then the suspension/resumption switch 51 outputs a pulse. In this case, as mentioned in the above, the output of the terminal Q of the FF 160 is changed from "H" to "L" by a pulse output from the AND gate 190; however there is no further output of a pulse, so that an erroneous operation of the system 150 can be avoided. As mentioned in the above, when only the suspension/resumption switch is used, the state-transition-control-circuit 175 is not influenced and the state of the system 150 is changed by the pulse of the suspension/resumption switch only, so that there is no erroneous operation of the system.

Figure 12:
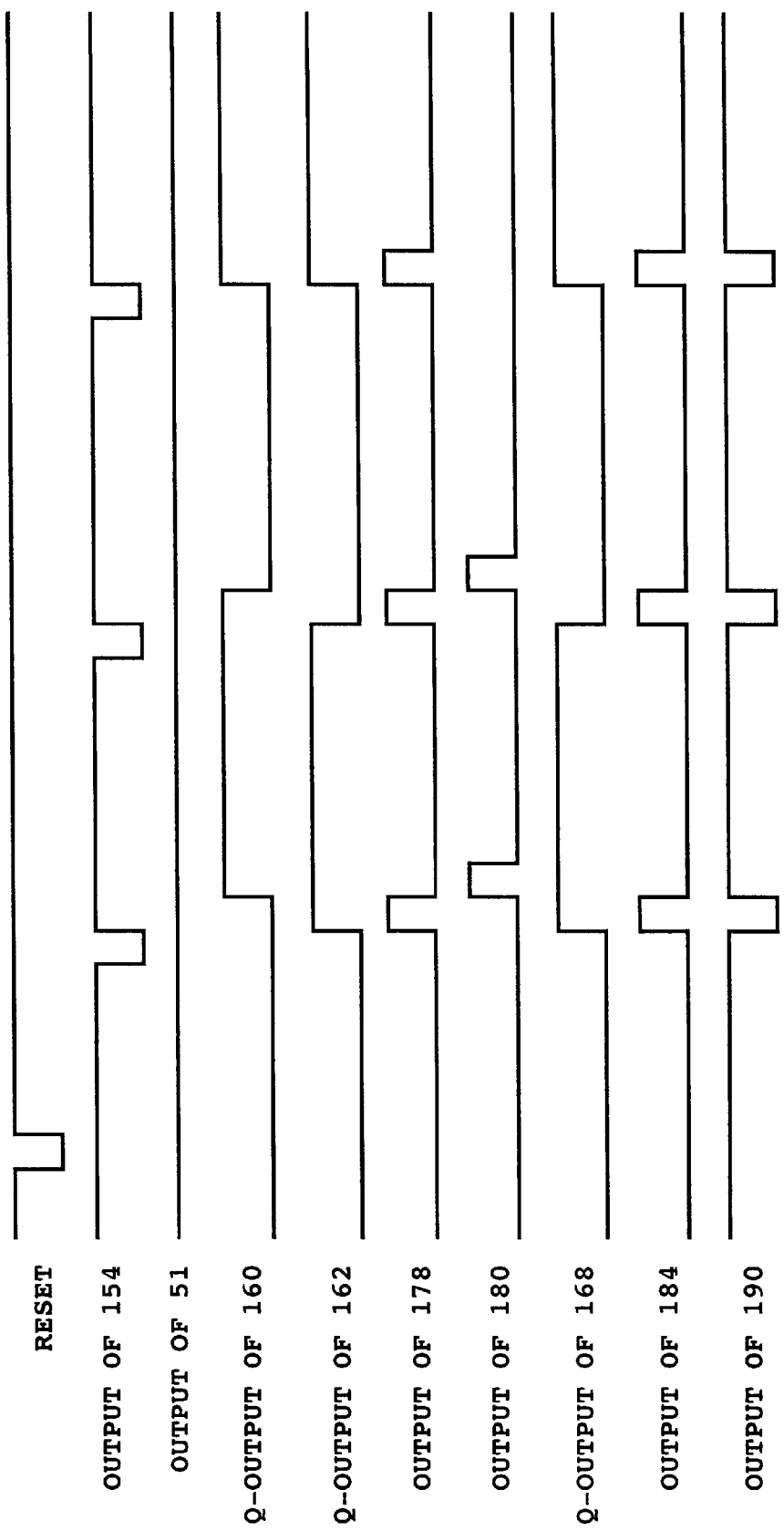
FIG. 12 shows a time chart in the device shown in FIG. 10.

(b) The Operation When Only the Pen-Insertion/Takeout-Detection-Signal of the Pen-Insertion/Takeout-Detection-Circuit 154 is Used FIG. 12 shows a time chart of the system shown in FIG. 10 when only the pen-insertion/takeout-detection-signal of the pen-insertion/takeout-detection-circuit 154 is used. When a user starts to use a pen-input information processing device, at first he will take out a pen from the pen housing portion and then he will make the power supply switch 52 ON. When the power supply switch 52 is made ON, the system 150 is activated and the state of the system becomes a normal state. The pulse of the reset signal RESET is output with the power-ON-reset. The FFs 160, 162 and 174 are reset by the reset signal RESET, and "L" are output from the terminals Q. The FFs 164 and 166 are reset by the FF 173 and "L" are output from the terminals Q. The FFs 170 and 172 are reset by the FF 174 and "L" are output from the terminals Q. Thereby, the outputs of the inverter 178, and OR gates 180 and 184 become "L" and the output of the inverter 188 becomes "H".

It is assumed that the user, after terminating the process by the pen-input information processing, houses the pen in the pen housing portion. The pen-insertion/takeout-detection-circuit 154 outputs a pulse of the pen-insertion/takeout-detection-signal. The FF 162, at the leading edge of the pulse, outputs "H" in latching the signal input to the terminal D. Since the output of the terminal Q of the FF 160 is "L", the output of the inverter 178 is changed from "L" to "H". Since the output of the OR gate 180 is "L", the FF 168, at the leading edge of a clock pulse at the terminal CLK, outputs "H" from the terminal Q. When the potential at the terminal Q is changed, the FFs 170 and 172 are operated in the same way as the FFs 164 and 166 are operated and output pulses from the terminals Q, and the inverter 188 reverses the pulse, and outputs the reversed pulse to the AND gate 190. Since the suspension/resumption switch 51 is not depressed yet, the output of the suspension/resumption switch 51 is "H", so that the AND gate 190 outputs the reversed pulse to the system 150 and the FF 160. In receiving the pulse, the state of the system 150 is changed from a normal state to a suspended state.

The FF 160 outputs "H" from the terminal Q, in receiving the pulse from the AND gate 190. Following the transition of the output of the terminal Q from "L" to "H", a pulse is output from the OR gate 180. The output of the terminal Q of the FF 168 is not changed. Assuming that a user takes out the pen from the pen housing portion, the pen-insertion/takeout-detection-circuit 154 outputs a pulse of the pen-insertion/takeout-detection-signal with the takeout of the pen. The FF 162, at the leading edge of the pulse, outputs "L" in latching the signal input from the terminal D. Since the output of the terminal Q of the FF 160 is "H", the output of the inverter 178 is changed from "L" to "H". Since the output of the OR gate 180 is "L", the FF 168, at the leading edge of a pulse at the terminal CLK, outputs "L" from the terminal Q. Since the potential of the terminals Q are changed from "H" to "L", the FFs 170 and 172 output pulses from the terminals Q, and the inverter 188 reverses the pulse and outputs the reversed pulse to the AND gate 190.

The pulse is input to the AND gate 190. Since the other input of the AND gate 190 is "H", a pulse is output from the AND gate 190 to the system 150 and the FF 160. The system 150 changes the state in receiving the pulse, The FF 160 outputs "L" from the terminal Q in receiving the pulse from the AND gate 190. A pulse is output from the OR gate 180 with the change of the output of the terminal Q from "H" to "L". The output of the terminal Q of the FF 168 is not changed. As mentioned in the above, in the case where the transition of a state is controlled using only a pen-insertion/takeout-detection-signal of the pen-insertion/takeout-detection-circuit 154, every time when a pen-insertion/takeout-detection-signal is input, a pulse for changing a state is output from the AND gate 190, and the state of the system 150 is automatically changed.

Figure 13:
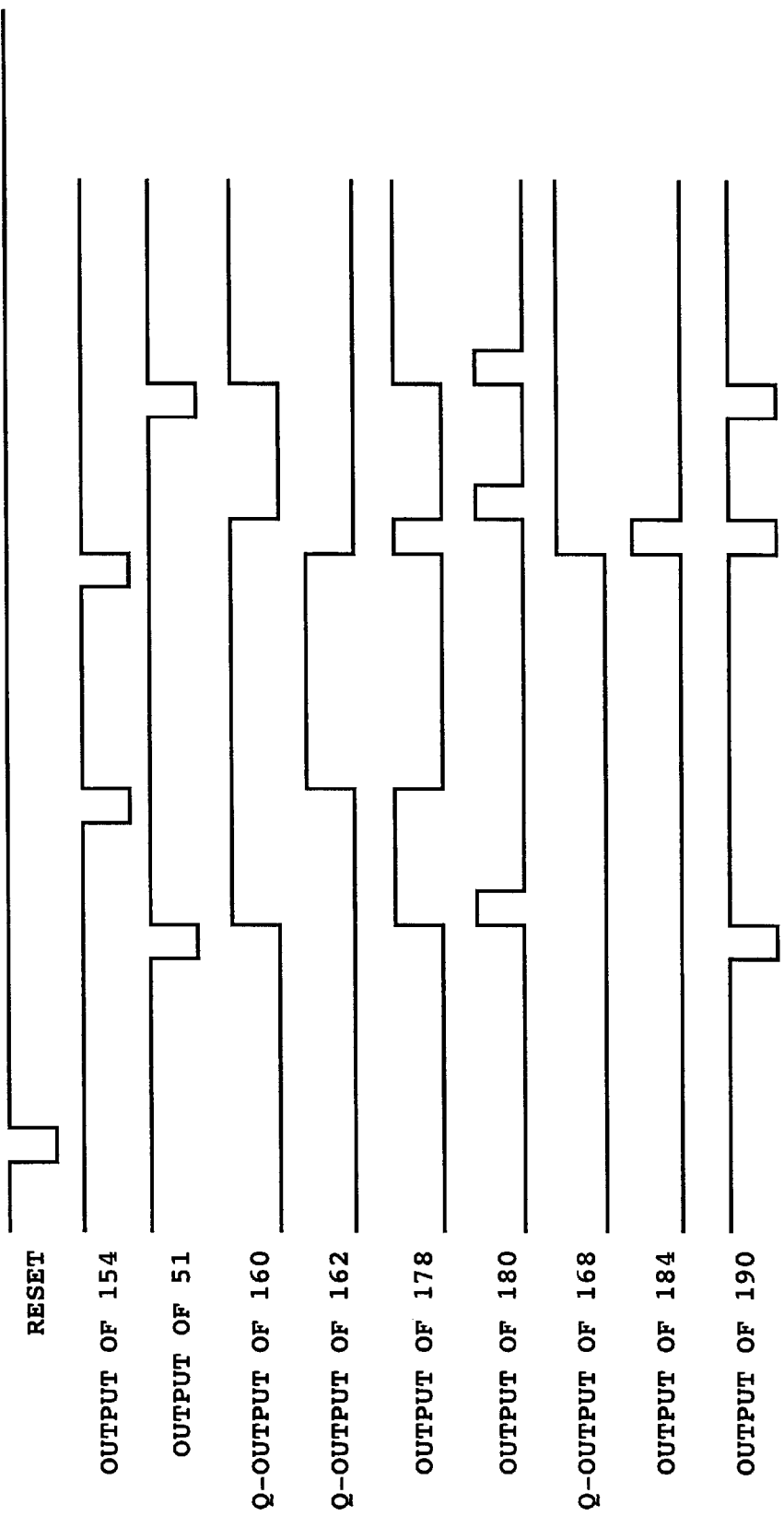
FIG. 13 shows a time chart in the device shown in FIG. 10.

(c) The Operation When the Suspension/Resumption Switch 51 and the Pen-Insertion/Takeout-Detection-Circuit 154 are Jointly Used FIG. 13 shows a time chart of a system shown in FIG. 10 when the suspension/resumption switch 51 and the pen-insertion/takeout-detection-circuit 154 are jointly used. In the present example, the explanation will be given when the operation is performed in the order as shown below: from the activation of a pen-input information processing device, to the ON of the suspension/resumption switch 51, to the housing of a pen, and then to the takeout of the pen. When a user starts to use a pen-input information processing device, at first he will take out a pen from the pen housing portion and then he will make the power supply switch 52 ON. When the power supply switch 52 is made ON, the system 150 is activated and the state of the system becomes a normal state. The FFs 160, 162, 164, 166, 168, 170, 172 and 174 are reset by the power-ON-reset and the terminals Q become "L" and the terminals xQ become "H".

It is assumed that the user, after terminating the process in the pen-input information processing device, depresses the suspension/resumption switch 51 to make the state of the system be in a suspended state. The suspension/resumption switch 51 outputs a pulse, and the AND gate 190 outputs the pulse as it is to the system 150 and to the FF 160. In receiving the pulse, the system 150 changes the state from a normal state to a suspended state. The state-transition-control-circuit 175 is operated in the same way as in the case (a), and the output from the terminal Q of the FF 160 is changed to "H"; however the states of the others are not changed.

It is assumed that the user houses the pen into the pen housing portion. The pen-insertion/takeout-detection-circuit 154 outputs a pulse of the pen-insertion/takeout-detection-signal with the housing of the pen. The FF 162, in receiving the pulse of the pen-insertion/takeout-detection-signal, changes the output of the terminal Q from "L" to "H". Since the output of the terminal Q of the FF 160 is "H" and the output of the terminal Q of the FF 162 is "H", the output of the inverter 178 is changed from "H" to "L"; however, since at the terminal CLK of the FF 168 a pulse does not rise, the output of the terminal Q is left as "L", and a pulse is not output from the AND gate 190. Thereby, the state of the system is not changed by the pulse of the pen-insertion/takeout-detection-circuit 154, so that the erroneous operation of the system 150 can be prevented.

It is assumed that a user takes out the pen from the pen housing portion. The pen-insertion/takeout-detection-circuit 154 outputs a pulse of the pen-insertion/takeout-detection-signal with the takeout of the pen. The FF 162, in receiving the pulse of the pen-insertion/takeout-signal, changes the output of the terminal Q from "H" to "L". Since the output of the terminal Q of the FF 160 is "H" and the output of the terminal Q of the FF 162 is "L", the output of the inverter 178 is changed from "L" to "H". The FF 168 changes the output of the terminal Q from "L" to "H" at the leading edge of a pulse at the terminal CLK.

The FFs 170 and 172 output pulses with the change of the outputs of the terminals Q. The inverter 188 reverses the pulse and outputs the reversed pulse to the AND gate 190. The AND gate 190 outputs the reversed pulse to the system 150 and to the FF 160. The system 150, in receiving the pulse, changes the state from a suspended state to a normal state. The FF 160 changes the output of the terminal Q from "L" to "H" at the leading edge of a pulse at the terminal CLK. As explained in the case (b), the output of the FF 168 is not changed with the change at the terminal Q of the FF 160, which prevents an erroneous operation of the system 150.

It is assumed that a user depresses the suspension/resumption switch 51 to change the state to a suspended state, and a pulse is output. In this case also, as explained in the case (a), the FF 160 changes the output of the terminal Q from "H" to "L" at the leading edge of a pulse at the terminal CLK. As explained in the case (a), the output of the FF 168 is not changed by the change of the terminal Q of the FF 160, which prevents the erroneous operation of the system 150. As mentioned in the above, even though the suspension/resumption switch 51 and the pen-insertion/takeout-detection-circuit 154 are used in combination, no erroneous operation occurs in the system 150. The third embodiment explained in the above is equally effective to the first embodiment and further according to the taste of a user the combined use of the suspension/resumption switch 51 and the pen-insertion/takeout-detection-signal from the pen-insertion/take- out-detection-circuit 154 is possible, which may upgrade the operability of the system 150.

The Fourth Embodiment

Figure 14:
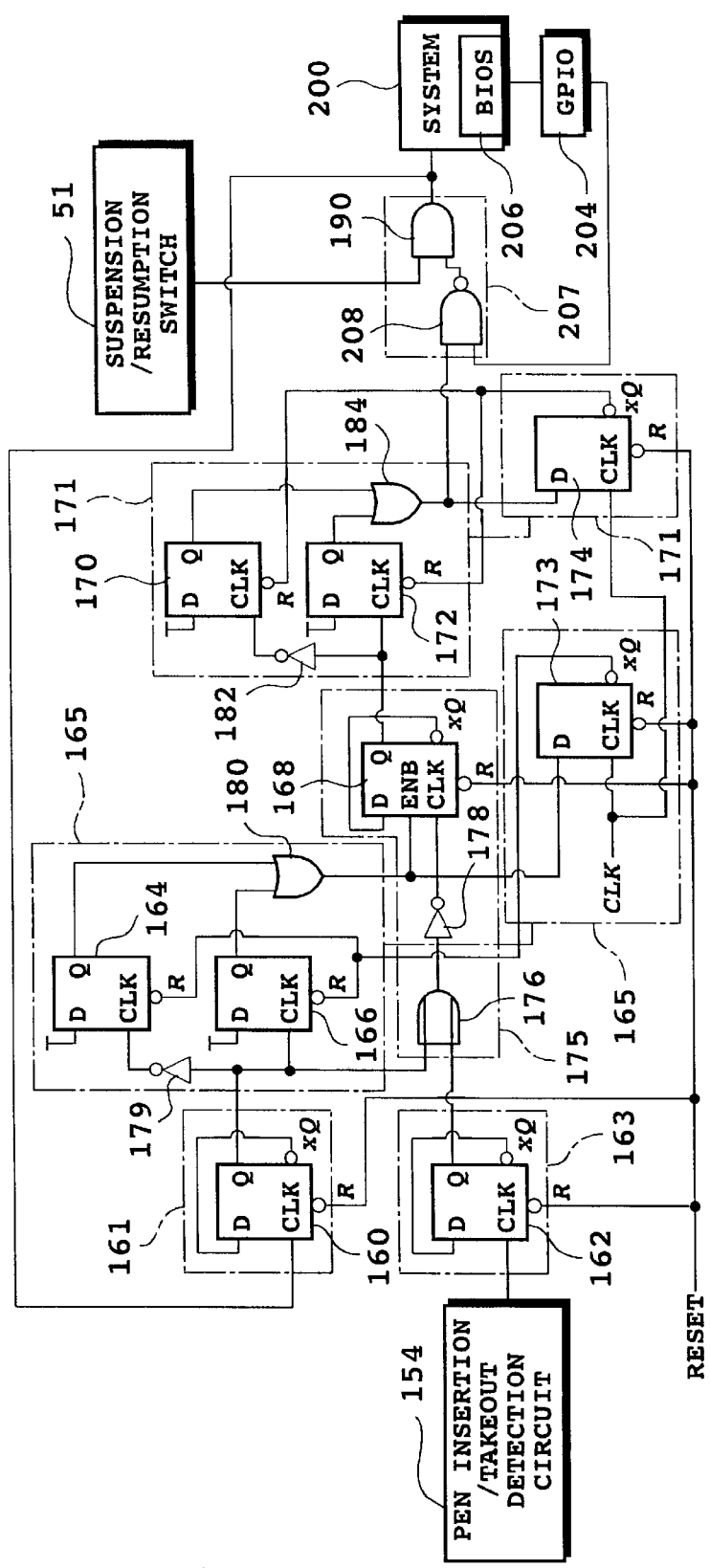
FIG. 14 shows a block diagram of a pen-input information processing device shown in the fourth embodiment according to the present invention.

FIG. 14 shows a block diagram of a pen-input information processing device in the fourth embodiment according to the present invention, and the same symbols are given to the parts which have the same functions as those of parts shown in FIG. 10. As shown in the figure, a pen-input information processing device comprises a system 200, a suspension/resumption switch 51, a pen-insertion/takeout-detection-circuit 154, a state memorizing circuit 161, a pen-state memorizing circuit 163, a state-transition-suppression-circuit 165, a state-transition-pulse-generation-circuit 171, a state-transition-control-circuit 175, a state-transition-pulse-output-circuit 208, a GPIO 204, and a pen 14 or 134, and a pen housing portion 33 or 130 which have the same constitution as those shown in FIG. 2 and FIG. 9. The system 200 has the same constitution as that of the system shown in FIG. 8; however, when the system 200 is activated, and when the BIOS 206 performs initial setting of a window, a storage device and the like, it is able to set whether the state is to be automatically changed with the insertion/takeout of a pen or not.

The BIOS 206 is so constituted that when the state-transition is to be performed automatically, it outputs "H" through the chip set 68 shown in FIG. 8, for example, from the GPIO 204, and when the state-transition is not performed automatically, "L" is output from the GPIO 204. The GPIO 204 is a register which outputs a signal from the BIOS 206 to the state-transition-pulse-output-circuit 208. The suspension/resumption switch 51, the pen-insertion/takeout-detection-circuit 154, the state memorizing circuit 161, the pen-state memorizing circuit 163, the state-transition-suppression-circuit 165, the state-transition-pulse-generation-circuit 171, and the state-transition-control-circuit 175 are substantially the same as those shown in FIG. 10, so that the explanation of them will be omitted. The only different point is that as the state-transition-pulse-output-circuit 208, the inverter 188 is provided in the system shown in FIG. 10 but NAND gate 208 is provided in the system shown in FIG. 14 in place of the inverter 188.

In the following the operation of a pen-input information processing device in the fourth embodiment shown in FIG. 14 will be explained.

When the power supply switch 52 shown in FIG. 7 is made ON, the BIOS 206 in the system 200 is activated. The BIOS 206, after initializing the window or the storage device such as a memory, allows a user to designate the function of automatic transition of a state with the insertion/takeout of a pen to be effective or ineffective. The user designates effectiveness or ineffectiveness of the automatic-state-transition-function with the insertion/takeout of the pen. The BIOS 206 inputs the designation of the user, and when the designation is to make the automatic-state-transition-function effective, it outputs "H" to the state-transition-pulse-output-circuit 208 through the GPIO 204, and when the designation is to make the function ineffective, it outputs "L" to the state-transition-pulse-output-circuit 208 through the GPIO 204.

(a) The Case Where the Designation is to Make the Automatic-State-Transition-Function Effective Since "H" is input to an input terminal of the NAND gate 208 through the GPIO 204, the NAND gate 208 outputs the reversed signal of an input signal to another input terminal of the OR gate 184. It is identical to the output of the inverter 188 shown in FIG. 10, so that the state-transition-control-circuit 175 and the like are operated in the same manner as the system shown in FIG. 10, and they control automatically the transition of the state following the pen-insertion/takeout-detection-signal.

(b) The Case Where the Designation is to Make the Automatic-State-Transition-Function Ineffective Since "L" is input to an input terminal of the NAND gate 208, the NAND gate 208 outputs "H". An AND gate 290 outputs the output of the suspension/resumption switch 51 as it is, and the state is not changed by the insertion/takeout of a pen. According to the fourth embodiment explained in the above, the same effects can be obtained as those obtained in the third embodiment, and further when the system 200 is activated, a user is able to select the automatic transition of a state with the insertion/takeout of a pen or non-automatic transition, so that the system is given further diversity in operation.

The present invention is not limited to the embodiments described in the above, and a variety of modifications are possible. One of the modifications is, for example, shown below. In FIG. 10, an example of the automatic state transition by the insertion/takeout of a pen using the suspension/resumption switch 51 or the pen-insertion/takeout-detection-circuit 154 is explained; however, in place of the suspension/resumption switch 51, for example, the state transition by the OS 62 shown in FIG. 8 and the state transition by the insertion/takeout of a pen can be jointly used. In this case, when a user, after terminating the use of the system 150, intends to resume the use of the system 150, he may designate the state transition using a menu screen and the like, and at that time, it may be a proper method to output a pulse designating the state transition from the OS 62 to the AND gate 190 through the chip set 68.

According to the present invention, the transition of a state is automatically controlled with the housing and take-out of a pen, so that further development in the operability of a pen-input information processing device can be expected.

What is claimed is:

1. A pen-input information processing apparatus which is operable by a pen, the apparatus comprising:

a pen housing which houses the pen;

a processing device which has a current device state changeable between a non-operative state and an operative state, said current device state being changed when a state-transition-control-signal is activated;

a suspension/resumption instruction unit;

a pen-housing-detection-unit which outputs a pen-housing-detection-signal showing the existence of or non-existence of said pen in said pen housing by detecting the housing of said pen to said pen housing or detecting the pen being taken out from said pen housing, said pen housing-detection-unit being provided separately from said suspension/resumption instruction unit;

a first memory unit which memorizes current device state; and a state-transition-control-unit which activates the state-transition-control-signal when said suspension/resumption-instruction-unit instructs said processing device to perform the transition of said state, said state-transition-control-unit also activating the state-transition-control-signal in a case where said current device state in said first memory unit is in the operative state and also said pen-housing-detection-signal shows the existence of said pen in said housing.

2. A pen-input information processing apparatus which is operable by a pen, the apparatus comprising:

a pen housing which houses the pen;

a processing device which has a current device state changeable between a non-operative state and an operative state, said current device state being changed when a state-transition-control-signal is activated;

a suspension/resumption instruction unit for instructing said processing device to perform a state transition;

a pen-housing-detection-unit which outputs a pen-housing-detection-signal showing the existence or non-existence of said pen in said pen housing in detecting the housing of said pen to said pen housing by detecting the housing of said pen to said pen housing or detecting the pen being taken out from said pen housing, said pen housing-detection-unit being provided separately from said suspension/resumption instruction unit;

a first memory unit which memorizes current device state; and a state-transition-control-unit which activates the state-transition-control-signal which instructs said processing device to perform the transition of said state when said suspension/resumption-instruction-unit instructs said processing device to perform the transition of the state, said state-transition-control-unit also activating the state-transition-control-signal in a case where said current device state in said first memory unit is in the non-operative state and also said pen-housing-detection-signal shows the non-existence of said pen in said housing.

3. A pen-input information processing apparatus which is operable by a pen, the apparatus comprising:

a pen housing which houses the pen;

a processing device which has a current device state changeable between a non-operative state and an operative state, said current device state being changed when a state-transition-control-signal is activated;

a suspension/resumption instruction unit which instructs said processing device to perform a state transition;

a pen-housing-detection-unit which outputs a pen-housing-detection-signal showing the existence or non-existence of said pen in said pen housing, by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which activates a state-transition-control-signal when said suspension/resumption instruction unit instructs said processing device to perform the state transition said state-transition-control-unit inactivating the state-transition-control-signal in a case where said current device state in said first memory unit is in the non-operative state and also said pen-housing-detection signal shows the existence of said pen in said pen housing.

4. A pen-input information processing apparatus which is operable by a pen, the apparatus comprising:

a pen housing which houses the pen;

a processing device which has a current device state changeable between a non-operative state and an operative state, said current device state being changed when a state-transition-control-signal is activated;

a suspension/resumption instruction unit which instructs said processing device to perform a state transition;

a pen-housing-detection-unit which outputs a pen-housing-detection-signal showing the existence or non-existence of said pen in said pen housing, by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which a state-transition-control-signal when said suspension/resumption instruction unit instructs said processing device to perform the state transition, said state-transition-control-unit inactivating the state-transition-control-signal in a case where said current device state in said first memory unit is in the operative state and also said pen-housing-detection signal shows the non-existence of said pen in said pen housing.

5. A pen-input information processing apparatus according to claim 1, further comprising an instruction unit which designates the effectiveness/ineffectiveness of the state transition control by said pen-housing-detection-signal, and wherein said state-transition-control-unit generates said state-transition-control-signal based on the designation of effectiveness/ineffectiveness of said control from said instruction unit.

6. A pen-input information processing apparatus according to claim 2, further comprising an instruction unit which designates effectiveness/ineffectiveness of the state transition control by said pen-housing-detection-signal, and wherein said state-transition-control-unit generates said state-transition-control-signal based on the designation of effectiveness/ineffectiveness of said control from said effectiveness/ineffectiveness instruction unit.

7. A control circuit for a pen-input information processing apparatus having a pen, a pen housing for housing the pen, a processing device which has a current device state changeable between a suspended state and a normal state, said current device state being changed when a state-transition-control-signal is activated, and a suspension/resumption instruction unit which instructs said processing device to perform state transition, said control circuit comprising:

a pen-housing-detection-unit which outputs a pen-housing-detection-signal showing the existence or non-existence of said pen in said pen housing by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which activates a state-transition-control-signal when said suspension/resumption-instruction-unit instructs the processing device to perform the state transition, said state-transition-control-unit also activating the state transition-control-signal in a case where said current device state in said first memory is in the normal state and also said pen-housing-detection-signal shows the existence of said pen in said pen housing.

8. A control circuit for a pen-input information processing apparatus having a pen, a pen housing for housing the pen, a processing device which has a current device state changeable between a suspended state and a normal state, said current device state being changed when a state-transition-control-signal is activated, and a suspension/resumption instruction unit which instructs said processing device to perform state transition, said control circuit comprising:

a pen-housing-detection-unit which outputs a pen-housing-detection-signal showing the existence or non-existence of said pen to said pen housing by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which activates the state-transition-control-signal when said suspension/resumption instruction unit instructs said processing device to perform state transition, said state-transition-control-unit also activating said state-transition-control-signal in a case where said current device state in said first memory unit is in the suspended state and also said pen-housing-detection-signal shows the non-existence of said pen in said pen housing.

9. A control circuit for a pen-input information processing apparatus having a pen, a pen housing for housing the pen, a processing device which has a current device state changeable between a suspended state and a normal state, said current device state being changed when a state-transition-control-signal is activated, and a suspension/resumption instruction unit which instructs said processing device to perform state transition, said control circuit comprising:

a pen-housing-detection-unit which outputs a pen-housing-detection-signal showing the existence or non-existence of said pen in said pen housing by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which activates a state-transition-control-signal when said suspension/resumption instruction unit instructs the processing device to perform the state transition, said state-transition-control-unit inactivating the state-transition-control-signal in a case where said current device state in said first memory unit is in the suspended state and also said pen-housing-detection-signal shows the existence of said pen in said pen housing.

10. A control circuit for a pen-input information processing apparatus having a pen, a pen housing for housing the pen, a processing device which has a current device state changeable between a suspended state and a normal state, said current device state being changed when a state-transition-control-signal is activated, and a suspension/resumption instruction unit which instructs said processing device to perform state transition, said control circuit comprising:

a pen-housing-detection-unit which outputs a pen-housing-detection-signal showing the existence or non-existence of said pen in said pen housing by detecting the housing of said pen to said pen housing or detecting the pen being taken out from said pen housing, said pen-housing-detection-unit being provided separately from said suspension/resumption instruction unit;

a first memory unit which memorizes current device state; and a state-transition-control-unit which activates a state-transition-control-signal when said suspension/resumption instruction unit instructs said processing device to perform the state transition, said state-transition-control-unit inactivating the state-transition-control-signal in a case where said current device state in said first memory unit is in the normal state and also said pen-housing-detection-signal shows the non-existence of said pen in said pen housing.

11. A method of controlling a pen-input information processing apparatus having a pen housing for housing a pen, a processing device, which has a current state changeable between a non-operative state and an operative state, said current device state being changed when a state-transition-control-signal is activated, a memory for memorizing the current state, and a suspension/resumption-instruction-unit, the method comprising:

detecting the existence or non-existence of said pen in said pen housing; and activating the state-transition-control-signal when said suspension/resumption-instruction-unit instructs said processing device to perform a state transition; or said current state in said memory is in the operative state and the existence of said pen in said pen housing is detected.

12. A method of controlling a pen-input information processing apparatus having a pen housing for housing a pen, a processing device, which has a current state changeable between a non-operative state and an operative state, said current device state being changed when a state-transition-control-signal is activated, a memory for memorizing the current state, and a suspension/resumption-instruction-unit, the method comprising:

detecting the existence or non-existence of said pen in said pen housing; and activating the state-transition-control-signal when said suspension/resumption-instruction-unit instructs said processing device to perform a state transition; or said current state in said memory is in the non-operative state and the non-existence of said pen in said pen housing is detected.

13. A method of controlling a pen-input information processing apparatus having a pen housing for housing a pen, a processing device, and a suspension/resumption-instruction-unit which instructs said processing device to perform state transition from a suspended state to a normal state, or from said normal state to said suspended state comprising:

a first step for detecting the existence or non-existence of said pen in said pen housing; and a second step for generating a state-transition-control-signal which instructs said processing device to perform state transition when said suspension/resumption-instruction-unit instructs said processing device to perform state transition, said state-transition-control-signal being not generated in a case where said state is in a suspended state and also said first step shows the housed state of said pen to said pen housing.

14. A method of controlling a pen-input information processing apparatus having a pen housing for housing a pen, a processing device, and a suspension/resumption-instruction-unit which instructs said processing device to perform state transition, from a suspended state to a normal state, or from said normal state to said suspended state comprising:

a first step for detecting the existence or nonexistence of said pen in said pen housing; and a second step for generating a state-transition-control-signal which instructs said processing device to perform the transition of said state when said suspension/resumption-instruction-unit instructs said processing device to perform the transition of a state, said state-transition-control-signal being not generated in a case where said state is in said normal state and also said first step shows a taken out state of said pen from said pen housing.

15. A pen-input information processing apparatus which is operable by a pen, the apparatus comprising:

a pen housing which houses the pen;

a processing device which has a current device state changeable between a suspended state and a normal state, said current device state being changed when a state-transition-control-signal is activated;

a pen-housing-detection-unit which outputs a pen-housing-detection-signal showing the pen housed in the pen housing or the pen taken out from said pen housing by detecting the housing of said pen to said pen housing or detecting the pen being taken out from said pen housing;

a suspension/resumption instruction unit which outputs a suspension/resumption instruction signal, independently of said pen-housing-detection-unit;

a first memory unit which memorizes said current device state;

a second memory unit which memorizes a first pen state or a second pen state of said pen based on the pen-housing-detection-signal, said first pen state being the pen housed in the pen housing and said second pen state being the pen taken out from said pen housing; and a state-transition-control-unit which receives the suspension/resumption control signal and the pen-housing-detection-signal, unconditionally activates the state-transition-control-signal in response to the suspension/resumption control signal, and conditionally activates the state transition control signal based on the current device state in said first memory unit and the memorized pen state in said second memory unit in response to the pen-housing-detection-signal.

16. A pen-input information processing device according to claim 15, wherein said state-transition-control-unit activates the state-transition-control-signal in response to the pen-housing-detection-signal in a case where said first memory unit shows the device is in the normal state and also said pen state in said second memory unit is changed from the second pen state to the first pen state.

17. A pen-input information processing device according to claim 15, wherein said state-transition-control-unit activates the state-transition-control-signal in response to the pen-housing-detection-signal in a case where said current device state in said first memory unit is in the suspended state and also said pen state in said second memory unit is changed from the first pen state to the second pen state.

18. A pen-input information processing device according to claim 15, wherein said state-transition-control-unit does not activate the state-transition-control-signal in response to the pen-housing-detection-signal in a case where said first memory unit shows the device is in the suspended state and also said pen state in said second memory unit is changed from the second pen state to the first pen state.

19. A pen-input information processing device according to claim 15, wherein said state-transition-control-unit does not activate the state-transition-control-signal in response to the pen-housing-detection-signal in a case where said first memory unit shows the device is in the normal state and also said pen state in said second memory unit is changed from the second pen state to the first pen state.

20. A pen-input information processing apparatus having a removable pen, the apparatus comprising:

a processor having a current device state which changes between a normal state and a suspended state in response to a state change signal;

a circuit which provides a detector signal on removal or return of the pen and determines a first or second pen state;

an instruction circuit which generates an instruction signal; and a logic circuit which receives the detector signal and in response generates the state change signal based on the current device state and the first or second pen state when the detector signal is received independently of the instruction signal; and which logic circuit receives the instruction signal and in response generates the state change signal when said instruction signal is received independently of said detector signal.

21. A pen-input information processing apparatus according to claim 20 wherein if the current device state is the suspended state and the pen state is the first pen state when the detector signal is received, the state change signal is generated and the processor is changed to the normal state.

22. A pen-input information processing apparatus according to claim 20 wherein if the current device state is the normal state and the pen state is the is the second pen state when the detector signal is received, the state change signal is generated and the processor is changed to the suspended state.

23. A pen-input information processing apparatus according to claim 20 wherein if the current device state is the normal state and the pen state is the first pen state when the detector signal is received, the state change signal is not generated and the processor state is not changed.

24. A pen-input information processing apparatus according to claim 20 wherein if the current device state is the suspended state and the pen state is the second pen state when the detector signal is received, the state change signal is not generated and the processor state is not changed.

25. A pen-input information processing apparatus according to claim 20 wherein said detector signal is a pulse.

26. A pen-input information processing apparatus according to claim 20 wherein said state change signal is a pulse.

27. A pen-input information processing apparatus according to claim 20 wherein said second instruction signal is a pulse.

28. A method of controlling a pen-input information processing apparatus which has a pen removably stored in a housing, the method comprising:

detecting movement of the pen on removal of the pen from the housing or on return of the pen to the housing and providing a first instruction signal;

determining the last position of the pen;

determining a current device state;

providing a second instruction signal; and generating a state change signal based on the second instruction signal when the second instruction signal is received independently of said first instruction signal; and generating the state change signal based on the last pen position and the current device state when the first instruction signal is received independently of the second instruction signal.

29. A method of controlling a pen-input information processing apparatus according to claim 28 wherein if the current device state is the normal state and the last pen position is a pen-out position when the first instruction signal is received, the state change signal is generated.

30. A method of controlling a pen-input information processing apparatus according to claim 28 wherein if the current device state is the suspended state and the last pen position is a pen-in position when the first instruction signal is received, the state change signal is generated.

31. A method of controlling a pen-input information processing apparatus according to claim 28 wherein if the current device state is the normal state and the last pen position is a pen-in position when the first instruction signal is received, the state change signal is not generated.

32. A method of controlling a pen-input information processing apparatus according to claim 28 wherein if the current device state is the suspended state and the last pen position is a pen-out position when the first instruction signal is received, the state change signal is not generated.

33. A pen-input information processing apparatus having a removable pen, the apparatus comprising:

a processor having a current device state which changes between a normal state and a suspended state in response to a pen position or in response to an instruction signal; and a logic circuit which detects a removal or a return of the pen and changes the current device state based on the current device state and the removal or the return of the pen and which receives the instruction signal and in response changes the current device state, independently of pen position.

\* \* \* \* \*

UNITED STATES PATENT AND TRADEMARK OFFICE
CERTIFICATE OF CORRECTION

PATENT NO. : 6,223,294 B1  
DATED : April 24, 2001  
INVENTOR(S) : Masanori Kondoh It is certified that error appears in the above-identified patent and that said Letters Patent is hereby corrected as shown below:

<u>Column 20,</u>  
Line 62, delete "is the" (second occurrence).

Signed and Sealed this

Thirteenth Day of November, 2001

*Attest:*

*Attesting Officer*

NICHOLAS P. GODICI  
*Acting Director of the United States Patent and Trademark Office*